(12) United States Patent
Hatanaka (10) Patent No.: US 6,798,399 B2
(45) Date of Patent: Sep. 28, 2004

(54) ELEVATED INPUT DEVICE (75) Inventor: Keith Hatanaka, La Jolla, CA (US)

(73) Assignee: S Twenty One International, Inc., La Jolla, CA (US)

( * ) Notice: Subject to any disclaimer, the term of this patent is extended or adjusted under 35 U.S.C. 154(b) by 193 days.

(21) Appl. No.: 09/946,858

(22) Filed: Sep. 4, 2001

(65) Prior Publication Data

US 2003/0043119 A1 Mar. 6, 2003

(51) Int. Cl.⁷ .............................................. G09G 5/00
(52) U.S. Cl. ...................... 345/168; 345/163; 345/167; 400/714; 361/680
(58) Field of Search ................................. 345/168, 172, 345/173, 161, 163, 167; 400/714, 715, 717; 248/127; 361/680

(56) References Cited

U.S. PATENT DOCUMENTS

| | | | |
|---|---|---|---|
| D336,898 S | 6/1993 | Cherubini et al. | D14/114 |
| 5,298,919 A * | 3/1994 | Chang | 345/163 |
| 5,413,294 A | 5/1995 | Greenquist | 248/127 |
| D361,556 S | 8/1995 | Moro et al. | D14/114 |
| 5,470,040 A | 11/1995 | Bhagat et al. | 248/232.4 |
| D365,342 S | 12/1995 | Evenson et al. | D14/114 |
| D368,081 S | 3/1996 | Comley | D14/114 |
| 5,543,821 A | 8/1996 | Marchis et al. | 345/167 |
| 5,575,578 A | 11/1996 | Lakoski et al. | 400/717 |
| D380,462 S | 7/1997 | Wilson | D14/114 |
| 5,655,743 A | 8/1997 | Gillis | 248/346.1 |
| D391,939 S | 3/1998 | Pappas | D14/114 |
| D392,955 S | 3/1998 | Wilson | D14/114 |
| D392,960 S | 3/1998 | Giorgio | D14/114 |
| 5,746,402 A | 5/1998 | Ambrose et al. | 248/118 |
| 5,746,403 A | 5/1998 | Ambrose et al. | 248/118 |
| 5,755,410 A | 5/1998 | Ambrose et al. | 248/118 |
| 5,765,790 A | 6/1998 | Kuldvere | 248/118 |
| 5,831,555 A * | 11/1998 | Yu et al. | 341/26 |
| D406,578 S | 3/1999 | Fitzsimmons | D14/114 |
| D409,588 S | 5/1999 | Dumont | D14/114 |
| 5,944,292 A | 8/1999 | Roman | 248/200 |
| 5,995,082 A | 11/1999 | Lakoski | 345/168 |
| 6,040,977 A * | 3/2000 | Hoffer | 361/680 |
| D428,395 S | 7/2000 | Jensen | D14/114 |
| 6,209,845 B1 * | 4/2001 | Klitsner et al. | 248/694 |
| 6,215,474 B1 * | 4/2001 | Shah | 345/168 |
| 6,262,716 B1 * | 7/2001 | Raasch | 345/168 |
| 6,285,299 B1 * | 9/2001 | King-DeBaun | 341/23 |
| 6,384,812 B1 * | 5/2002 | Dunn | 345/168 |
| 6,388,660 B1 * | 5/2002 | Manser et al. | 345/173 |
| 6,487,396 B1 * | 11/2002 | Sassi | 455/90.1 |

FOREIGN PATENT DOCUMENTS

JP       407319595       * 12/1995

* cited by examiner

*Primary Examiner*—Regina Liang
(74) *Attorney, Agent, or Firm*—Woodard, Emhardt, Moriarty, McNett & Henry LLP (57) ABSTRACT

An input system that mounts over a portion of a keyboard, which system may include an input device corresponding to at least one keyboard key covered by the input system. The input device may comprise a key or other input mechanism easily accessible to the user, and at least one of the input mechanisms may functionally correspond to one of the covered keyboard keys. The input mechanisms may be conventional keyboard keys, buttons, touchpads, or any suitable input mechanism. The input system body may comprise a platform elevated over the keyboard, the platform adapted to support a mouse. Alternatively, the input system may comprise an input device that eliminates the need for a separate mouse. Such an input device may include one or more of a trackball, dials or wheels, buttons, digital tablet, touch screen, or any suitable mechanism for inputting information otherwise input by a mouse or other electrical input device. The input system may be integral with, or separate or separable from, the keyboard.

28 Claims, 12 Drawing Sheets

ELEVATED INPUT DEVICE

FIELD OF THE INVENTION

The present invention relates to computer input devices and supports therefor.

BACKGROUND OF THE INVENTION

Many computer systems require extensive use of both a mouse and keyboard. The computer mouse is often placed on the same surface on which the computer keyboard is placed. Assuming a right handed user, the user is constantly moving their right hand from the keyboard to the mouse and back. With newer extended keyboards, this requires the right hand to move several inches, frequently more than one foot, before reaching the surface on which the mouse rests. The user must then find the mouse on that surface. Also, when the user moves the right hand back to the home keys on the keyboard, it is difficult to position the hand correctly on the home keys because of the distance through which the hand must move. This problem increases the stress on users and lowers their work efficiency.

One prior art solution to this problem is to mount a track ball device on the keyboard, where the track ball device replaces the mouse. While the integral track ball device addresses the problem, very few keyboards incorporate that device because of increased keyboard cost and because it results in a non-standard keyboard.

Another prior art solution is to provide a platform positioned above the right side of the keyboard, wherein a conventional mouse can be placed on the platform, closer to the user's right hand. While the elevated platform system reduces the distance the right hand must move, implementing the system creates new problems. For instance, by providing a platform above a portion of the keyboard, the platform covers a portion of the keys on the keyboard, forcing the user to either forego use of the covered keys or to constantly move the entire system to uncover the keys. Further, a separate mouse sitting on top of the elevated platform could be prone to sliding off the platform.

Thus, there exists a need for a system which will allow the mouse or mouse functions to be closer to the right hand of a keyboard user, but which avoids the problems of prior art systems.

SUMMARY OF THE INVENTION

A solution to this problem is an input system that mounts over a portion of a keyboard, which system may include an input device corresponding to at least one keyboard key covered by the input system. The input system may comprise a body that rests on the same surface as the keyboard, and that extends over a portion of the keyboard. The input device may comprise a key or other input mechanism easily accessible to the user, and at least one of the input mechanisms may functionally correspond to one of the covered keyboard keys. The input mechanisms may be conventional keyboard keys, buttons, touchpads, or any suitable input mechanism.

The input system body may comprise a platform elevated over the keyboard. The platform may function as a mouse pad for supporting a mouse. Alternatively, the input system may comprise an input device that eliminates the need for a separate mouse. Such an input device may include one or more of a trackball, dials or wheels, buttons, digital tablet, touch screen, or any suitable mechanism for inputting information otherwise input by a mouse or other electrical input device. The input system may be integral with, or separate or separable from, the keyboard.

DETAILED DESCRIPTION

Figure 1:
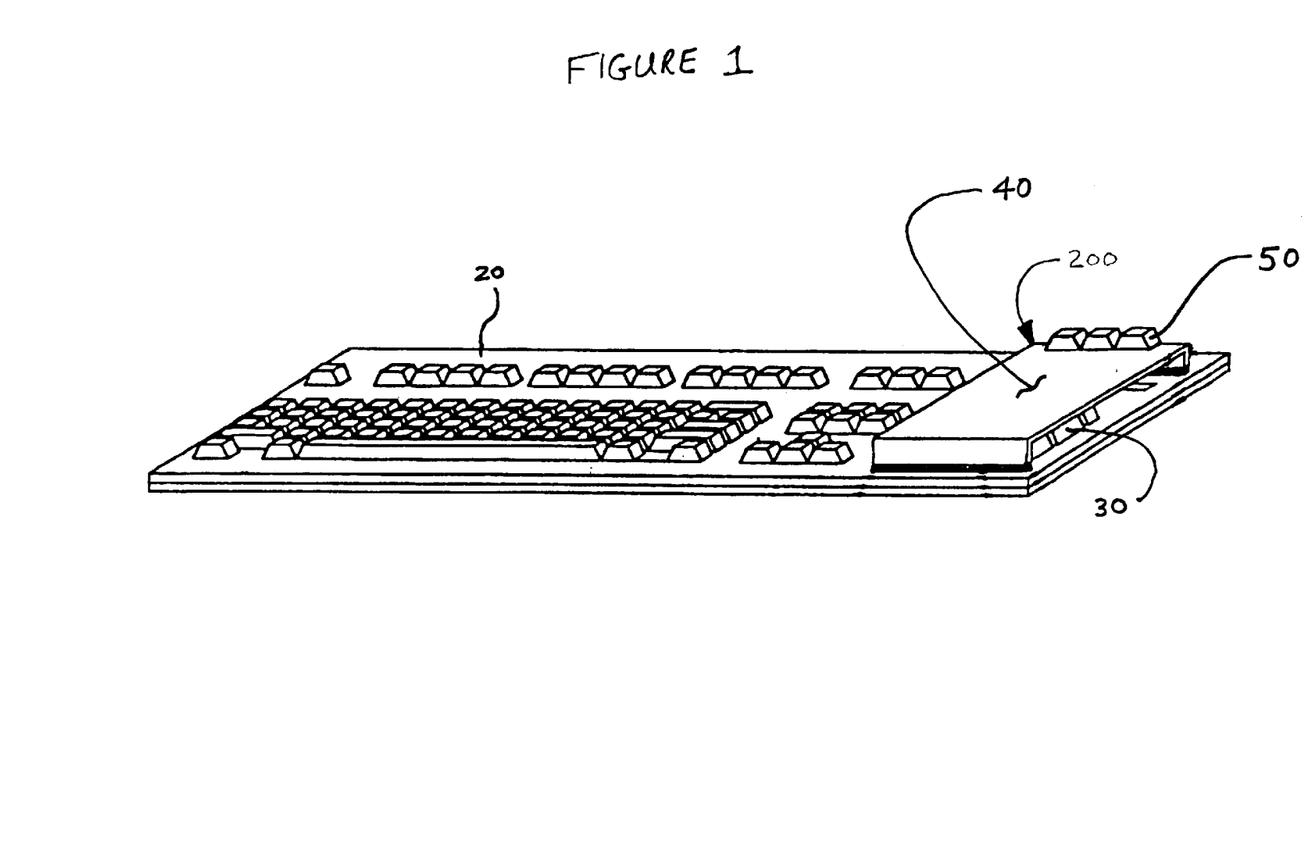
FIG. 1 shows a perspective view of a keyboard with an input device being positioned off the keyboard in accordance with one embodiment of the invention.

FIGS. 1 through 12 show examples of some aspects of the invention, but do not define or limit the invention. The invention is defined only by the concluding claims, which are to be considered individually. FIG. 1 shows an input system 200 in combination with a keyboard 20, the keyboard 20 comprising a key 30 that, when activated, generates an electrical signal corresponding to the key 30. The input system 200 is positioned over the keyboard 20 such that the input system 200 blocks a user's access to the key 30. The input system 200 comprises a first mechanism 50 accessible to the user that, when activated by the user, generates the first electrical signal corresponding to the key 30. As discussed herein, the first mechanism 50 may be any suitable mechanism for user input. For example, the first mechanism 50 may be a typical keyboard key, touchpad and may have the same appearance as covered key 30.

The input system 200 may be provided with a platform 40 adapted to support a conventional mouse (not shown) above and in close proximity to the keyboard 20. By placing a mouse on surface 40, the mouse is placed conveniently close to the keyboard user's right hand, so that the user need not reach beyond the right side of the keyboard 20 to reach the mouse. The platform 40 can be positioned directly above the keyboard 20, and the platform 40 can provide a surface on which to manipulate the mouse.

The input system 200 may be economically formed from injection-molded plastic, like a typical keyboard 20, or may be made from any structurally suitable material, such as but not limited to metal, wood, glass or polymer. The input system 200 may be shaped to rest on the keyboard 20, as shown in FIG. 1. The input system 200 is preferably shaped so that it does not touch covered key 30 when the input system 200 is positioned over key 30.

The first mechanism 50 may comprise an electrical switch that changes conductivity when the switch is activated. In the case where the first mechanism 50 comprises a keyboard key, the switch may be activated when a user depresses the key. The change in conductivity of the switch is communicated as an electrical signal to a receiving device, such as a computer (not shown), or any other device adapted to receive signals from a keyboard 20. If the keyboard 20 has an input jack (not shown), then the keyboard may serve as the receiving device. The electrical signal may be communicated to the receiving device using any means known for transmitting electrical signals from a keyboard 20 to a receiving device. Such communication means may include, for instance, a cable, wire, or optical fiber, or wireless transmission means. An example of such a wireless input system is shown in U.S. Pat. No. 6,052,116 which issued Apr. 18, 2000 to Takagi, and is incorporated herein by reference. Any combination of wireless or non-wireless keyboards 20 and wireless or non-wireless input devices 200 may be used.

Figure 2:
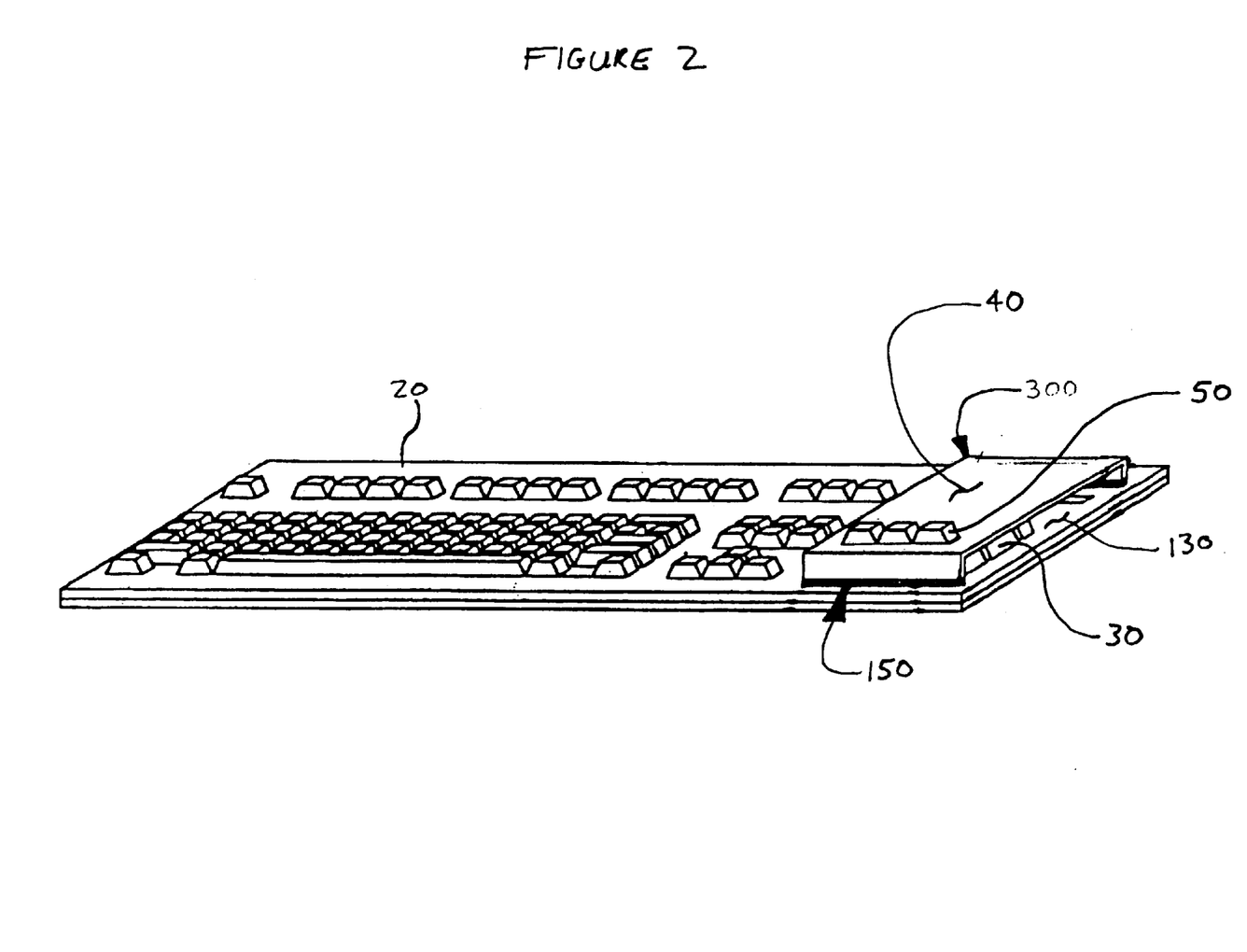
FIG. 2 shows a perspective view of a keyboard with an input device being positioned off the keyboard in accordance with another embodiment of the invention.

The first mechanism 50 may be located in any convenient location on the input system 200. FIG. 2 shows an input system 300 in combination with a keyboard 20, where the first mechanism 50 is located on the input system 300 differently than as shown on the input system 200 in FIG. 1. The input system 200 or 300 may be secured to the keyboard 20. For instance, a piece of fabric of small hooks that sticks to a corresponding fabric of small loops, such as Velcro 150, may be applied to the input system 300 and to a corresponding location on the keyboard 20, such as the top surface 130 of the keyboard 20, to secure the input system 300 to the keyboard 20.

Figure 3:
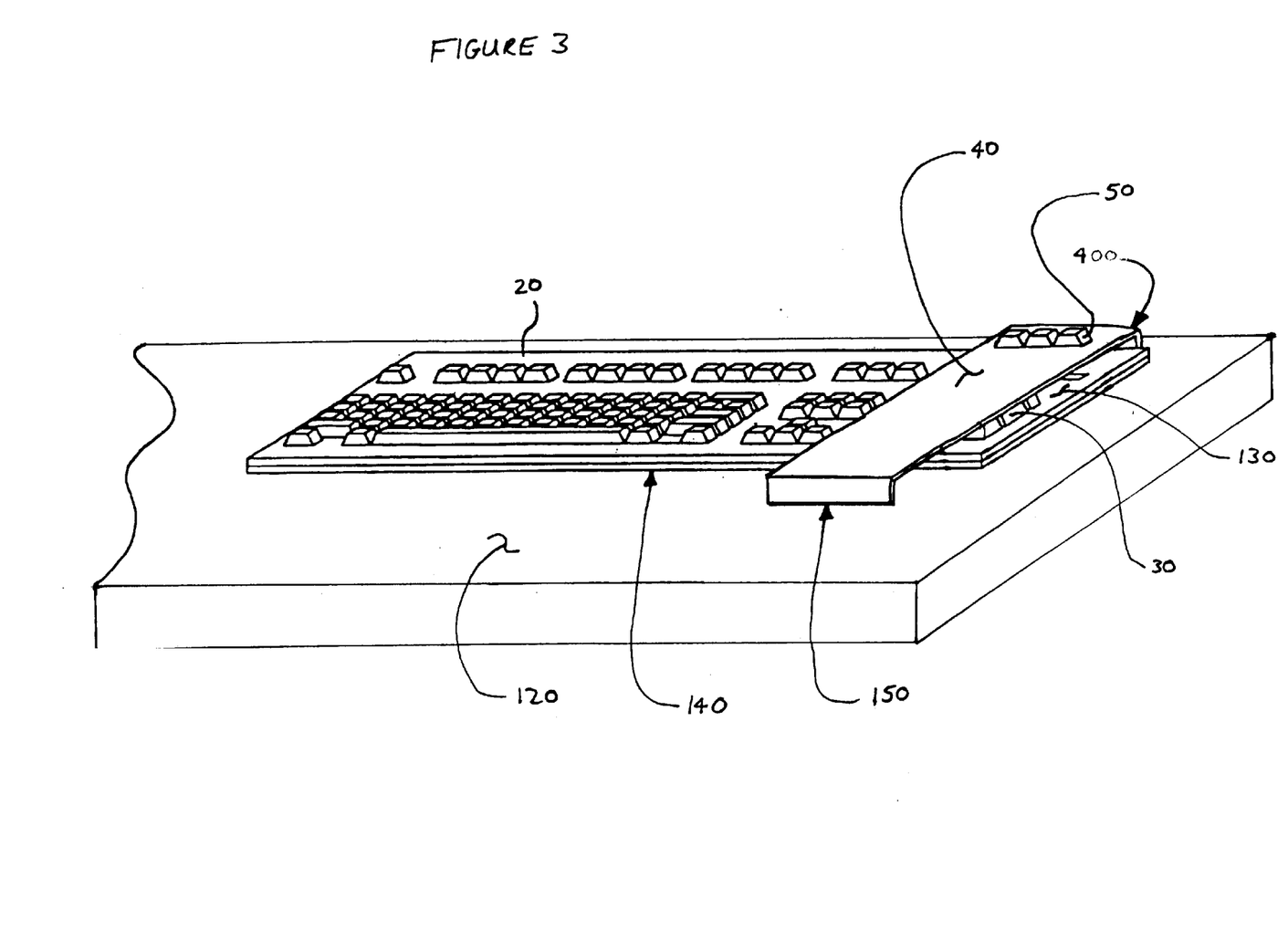
FIG. 3 shows a perspective view of a keyboard with an input device in accordance with one embodiment of the invention being positioned over the keyboard.

FIG. 3 shows an input system 400 and a keyboard 20 resting on a support surface 120. The keyboard 20 comprises a first body with a top surface 130 comprising a key 30 and a first bottom surface 140 contacting the support surface 120. The key 30 is adapted to generate an electrical input signal when a user depresses the key. The input system 400 is adjacent the keyboard, and comprises a second body with a second bottom surface 150 contacting the support surface 120, the second body extending upward from the support surface 120 to a height, and further extending from the height over at least a portion of the top surface 130 such that the second body extends over and in close proximity to the key 30. The input system 400 further comprises a first input mechanism 50 that when activated by a user generates an electrical input signal equivalent to the electrical signal generated when the user depresses the key 30 on the keyboard 20. Thus, by operating the first mechanism 50 the user has access to the functionality of key 30, even though the user cannot easily access the key 30 since access is obstructed or blocked by the body of input system 400.

Figure 4:
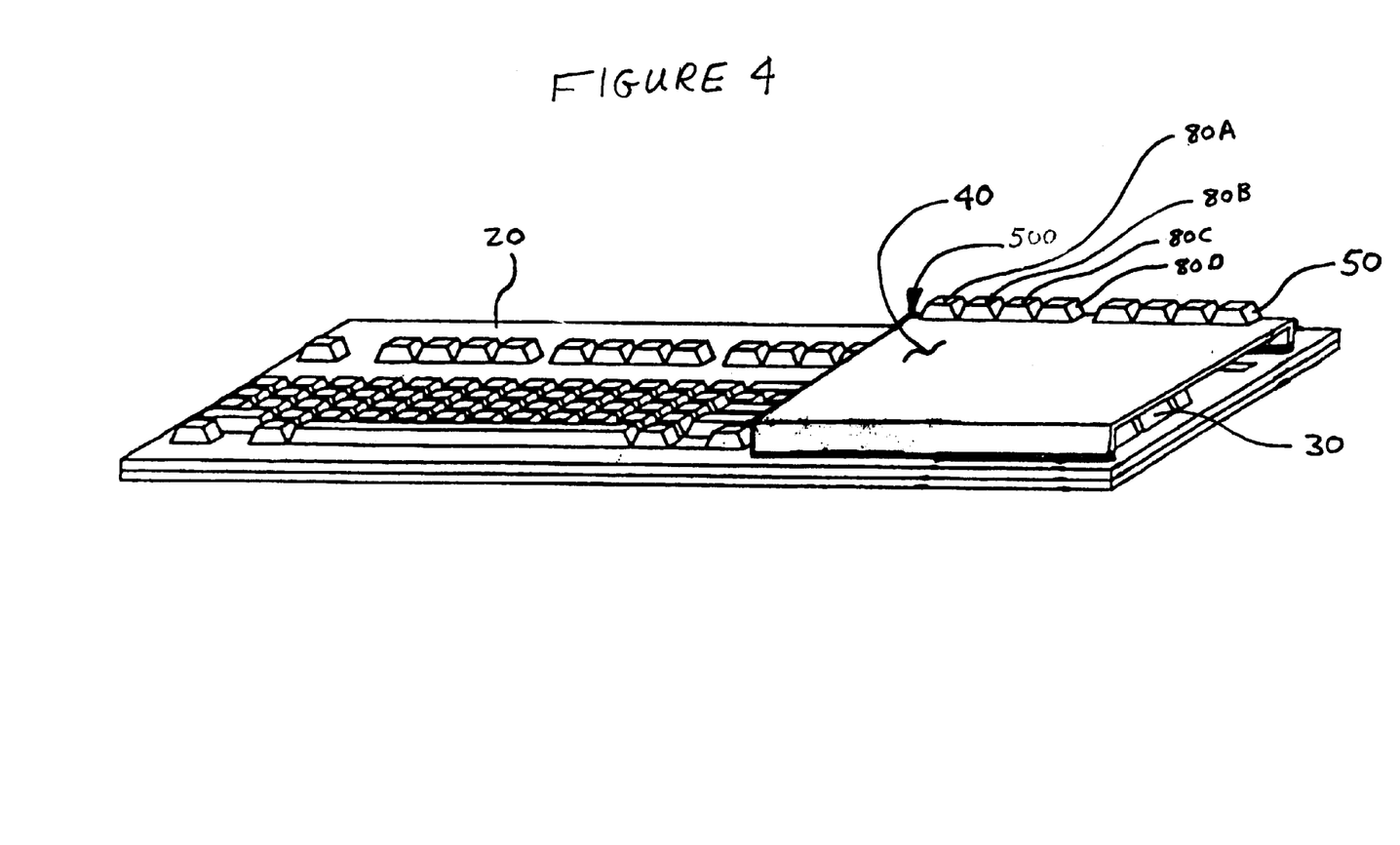
FIG. 4 shows a perspective view of a keyboard with an input device being positioned off the keyboard in accordance with yet another embodiment of the invention.

In addition to the first mechanism 50, the input device 200, 300 or 400 may comprise other input mechanisms. FIG. 4 shows a keyboard 20 in combination with an input device 500 comprising a second mechanism 80A, a third mechanism 80B, a fourth mechanism 80C and a fifth mechanism 80D. In one example, the second mechanism 80A is a key corresponding to a left-arrow key on keyboard 20, the third mechanism 80B is a key corresponding to an up-arrow key on keyboard 20, the fourth mechanism 80C is a key corresponding to a down-arrow key on keyboard 20, and the fifth mechanism 80D is a key corresponding to a right-arrow key on keyboard 20.

It is understood that the input device 200, 300, 400 or 500 may comprise any number of input mechanisms 80, limited only by preference and available space. It is further understood that each input mechanism 80 may correspond with any key on the keyboard 20, or may correspond with a functionality that is not available on the keyboard 20. For instance, an input mechanism could be adapted to produce a signal corresponding to any of the following keyboard keys: any of the letters A through Z; any of the numbers 0 through 9; Escape; Tab; Caps Lock; Shift; Control; Microsoft Start; Alt; Space; Enter; Back Space; comma; period; question mark; back slash; forward slash; greater than; less than; semi-colon; colon; apostrophe; quotation mark; left bracket; right bracket; plus; minus; equals; dash; left parenthesis; right parenthesis; asterisk; ampersand; percent sign; dollar sign; pound sign; function keys (e.g., F1–F12, etc.); Print Screen; Scroll Lock; Pause; Break; Insert; Home; Page Up; Delete; End; Page Down; and Number Lock. A keyboard key corresponding to any given input mechanism 80 may or may not be covered and blocked when the input device 200, 300, 400 or 500 is used in conjunction with a keyboard 20.

Figure 5:
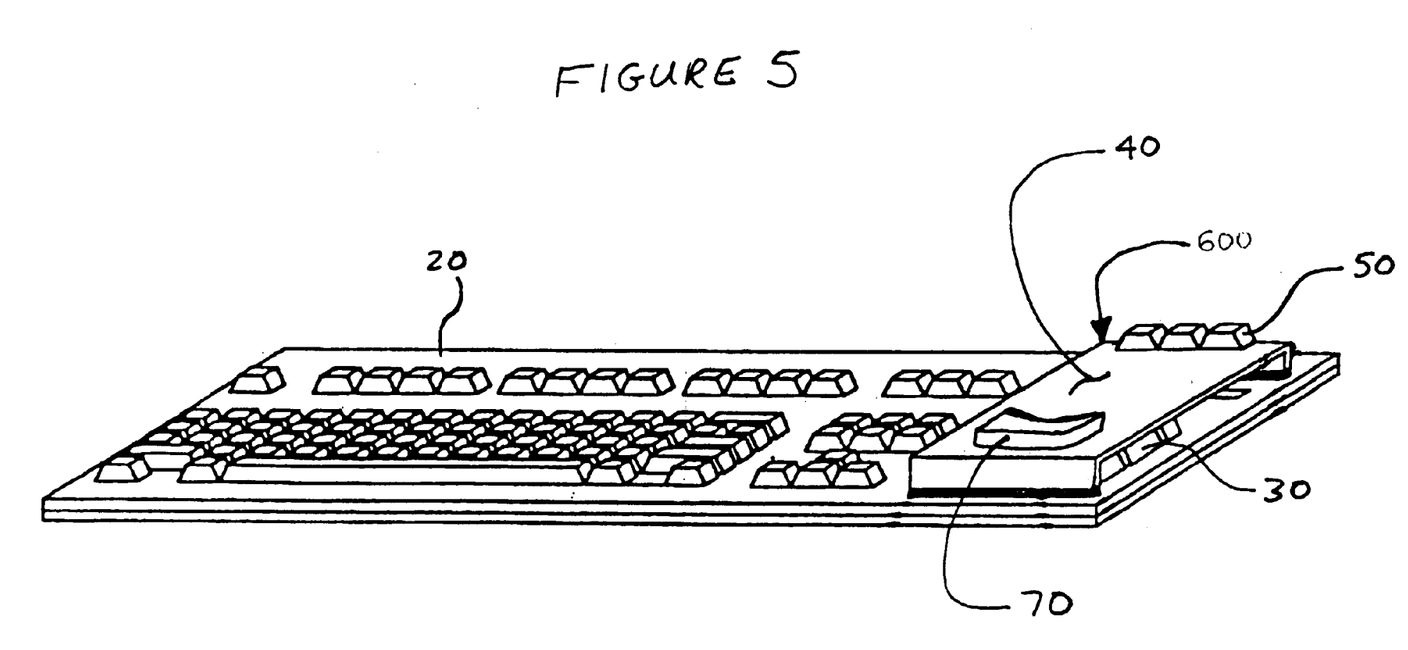
FIG. 5 shows a perspective view of a keyboard with an input device being positioned off the keyboard in accordance with still another embodiment of the invention.

FIG. 5 shows a keyboard 20 in conjunction with an input device 600 comprising a hand rest 70. The hand rest 70 is a user wrist support for supporting the wrist during operation of the input device 600. The hand rest 70 can comprise a resilient cushion positioned on the platform 40 to be located under a user's wrist and/or under the palm of a user's hand during operation of the input device 600. The hand rest 70 can be permanently or removably attached to the input device 600. Other references teach providing support for the wrist when using a computer inputting device by placing a cushion in front of the device. See for example, U.S. Pat. No. 5,628,483 which issued May 13, 1997 to Smith et al.; U.S. Pat. No. 5,165,630 which issued Nov. 24, 1992 to Connor; and U.S. Pat. No. 5,556,061 which issued Sep. 17, 1996 to Dickie, all of which are incorporated herein by reference. Like all the features discussed in this Detailed Description, the hand rest 70 can be used in combination with any of the features discussed in input devices 200, 300, 400, 500, or any other described input device.

Figure 6:
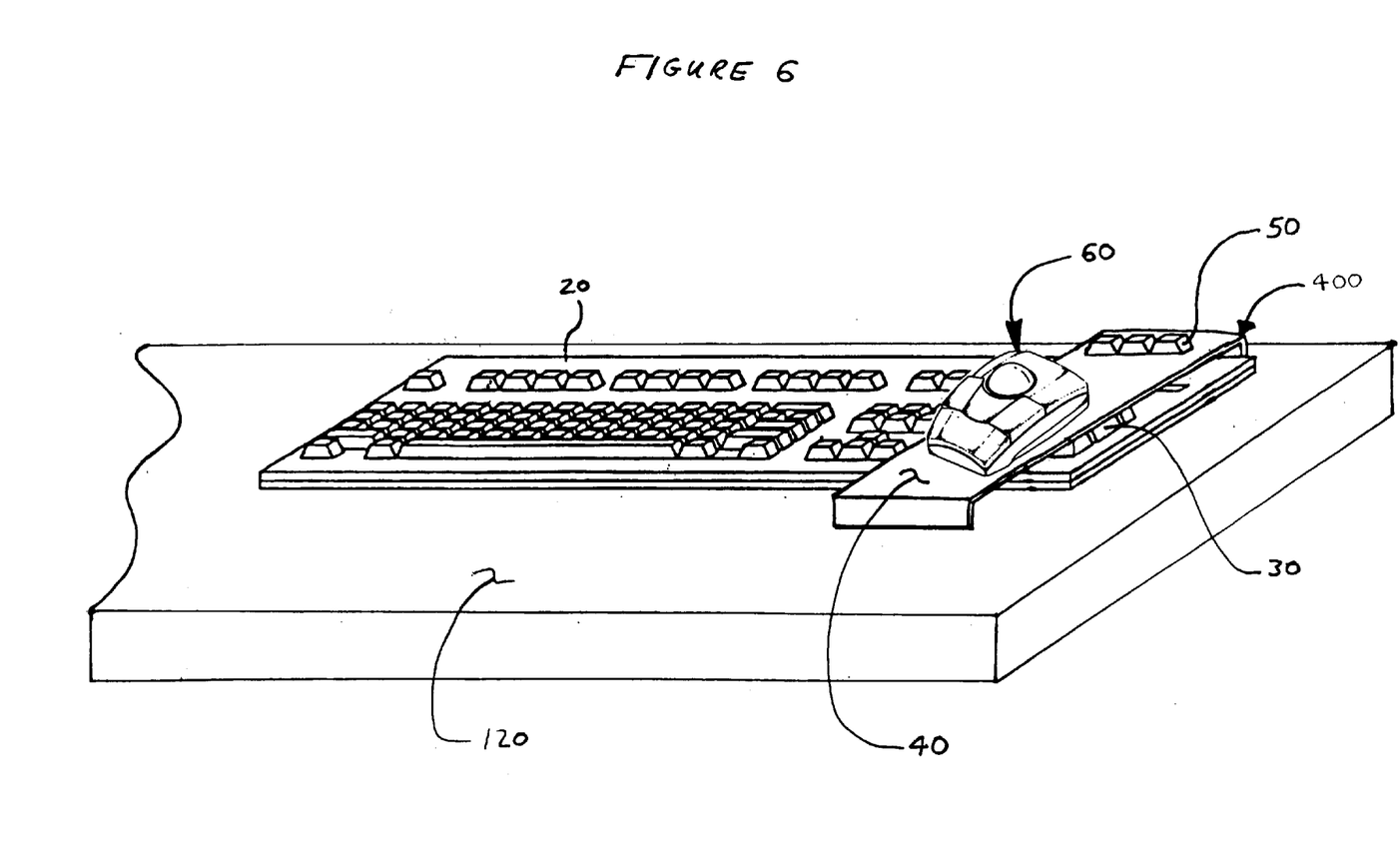
FIG. 6 shows a perspective view of a keyboard and a mouse with an input device in accordance with one embodiment of the invention being positioned over the keyboard, and the mouse being positioned on the input device.

FIG. 6 shows a keyboard 20 in conjunction with an input device 400 with a conventional mouse 60 resting on the platform 40 of the input device 400. The platform 40 of input device 400 is adapted to support the mouse 60 so that a user can manipulate the mouse on the platform 40. In this example the platform 40 acts as a mouse pad.

Figure 7:
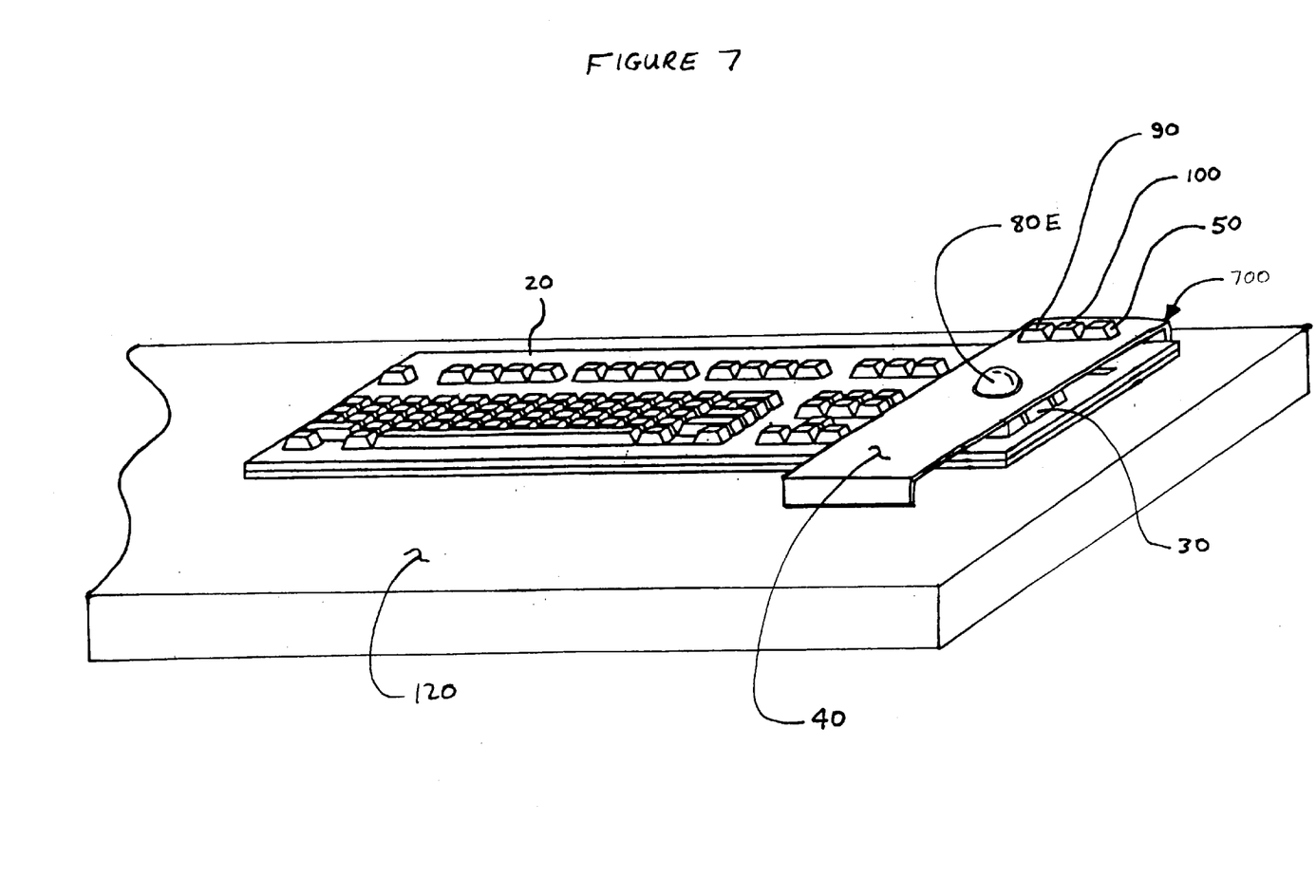
FIG. 7 shows a perspective view of a keyboard with an input device in accordance with another embodiment of the invention being positioned over the keyboard.

FIG. 7 shows a keyboard 20 in conjunction with an input device 700 comprising a second mechanism 80E that, when activated by a user, generates a second electrical signal. The second electrical signal corresponds to an electrical signal produced by a conventional mouse when the mouse is moved relative to the surface on which the mouse sits. The second electrical signal typically corresponds to an input signal to a computer for moving a cursor on a computer screen or monitor.

In FIG. 7 a second mechanism 80E is shown as a trackball attached to input device 700. A trackball is a computer cursor control device used in many notebook or laptop computers. Essentially, the trackball is an upside-down mouse that rotates in place within a socket. The user rolls the ball to direct the cursor to the desired place on the screen. While the second mechanism 80E is shown as a trackball, it can be any suitable input mechanism, such as one or more arrow keys, or a pointing stick. A pointing stick is an input device for laptop or notebook computers, such as IBM's TrackPoint that is integrated into the middle of the keyboard in ThinkPad series notebooks. A third input mechanism 90 and fourth input mechanism 100 are shown in FIG. 7. When activated by a user these mechanisms may generate electrical signals corresponding to other keys on the keyboard 20, or may generate electrical signals corresponding to conventional left and right mouse buttons, respectively.

Figure 8:
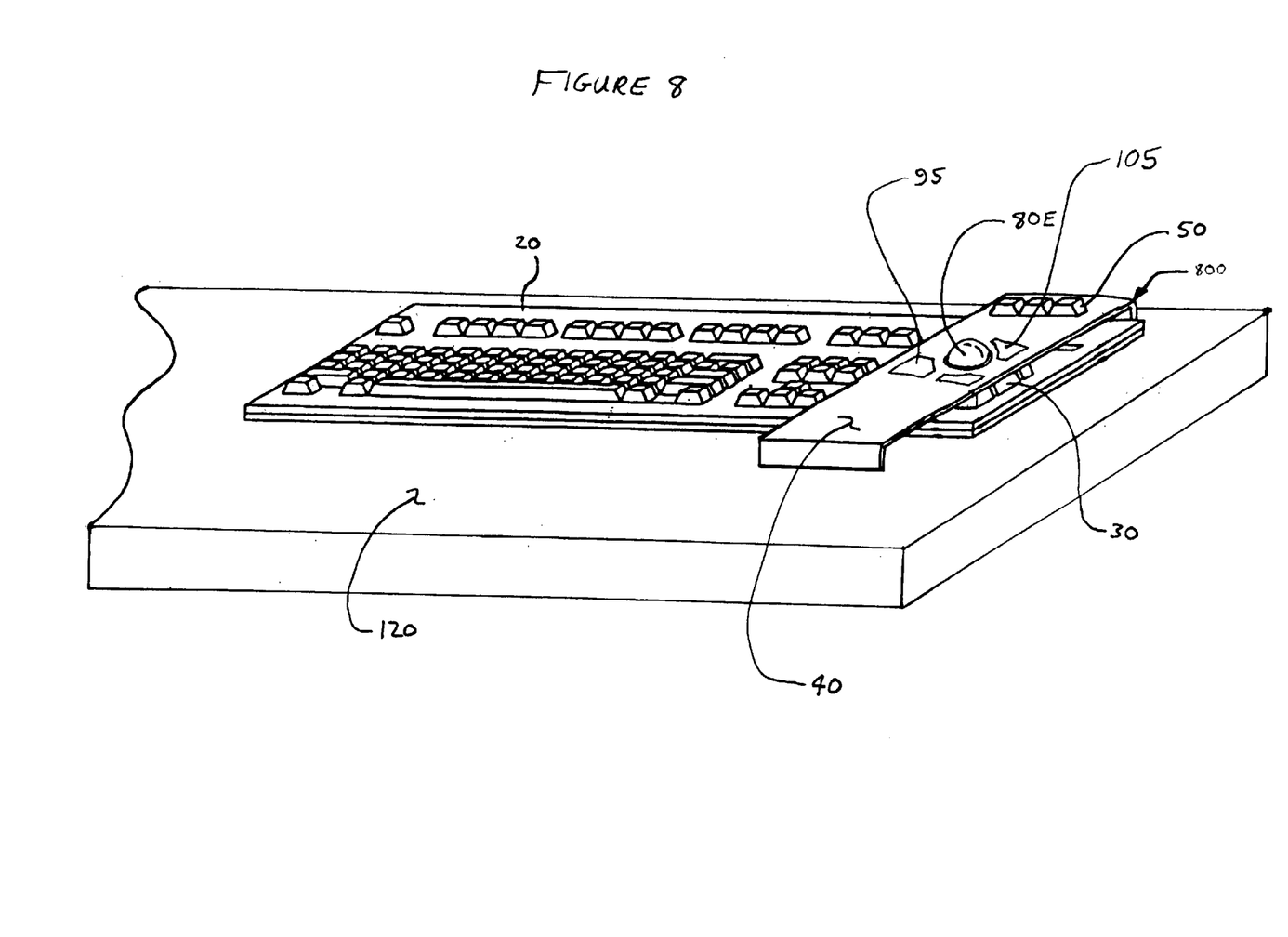
FIG. 8 shows a perspective view of a keyboard with an input device in accordance with yet another embodiment of the invention being positioned over the keyboard.

FIG. 8 shows a keyboard 20 in conjunction with an input device 800 comprising third and fourth input mechanisms 95, 105 that, when activated by a user, may generate electrical signals corresponding to conventional left and right mouse buttons, respectively. Alternatively, third and/or fourth mechanisms 95, 105 may generate electrical signals corresponding to other mouse or joystick inputs. As with the other input mechanisms mentioned herein, the input mechanisms 95, 105 may be buttons, keys, touchpads, or any other suitable input mechanism.

Any of input mechanisms 90, 95, 100 and/or 105 may comprise a rotatable member, such as a wheel, dial, trackball or the like. Such rotatable members are found on some computer mice, and are often configured to assist the user in scrolling the computer display.

Figure 9:
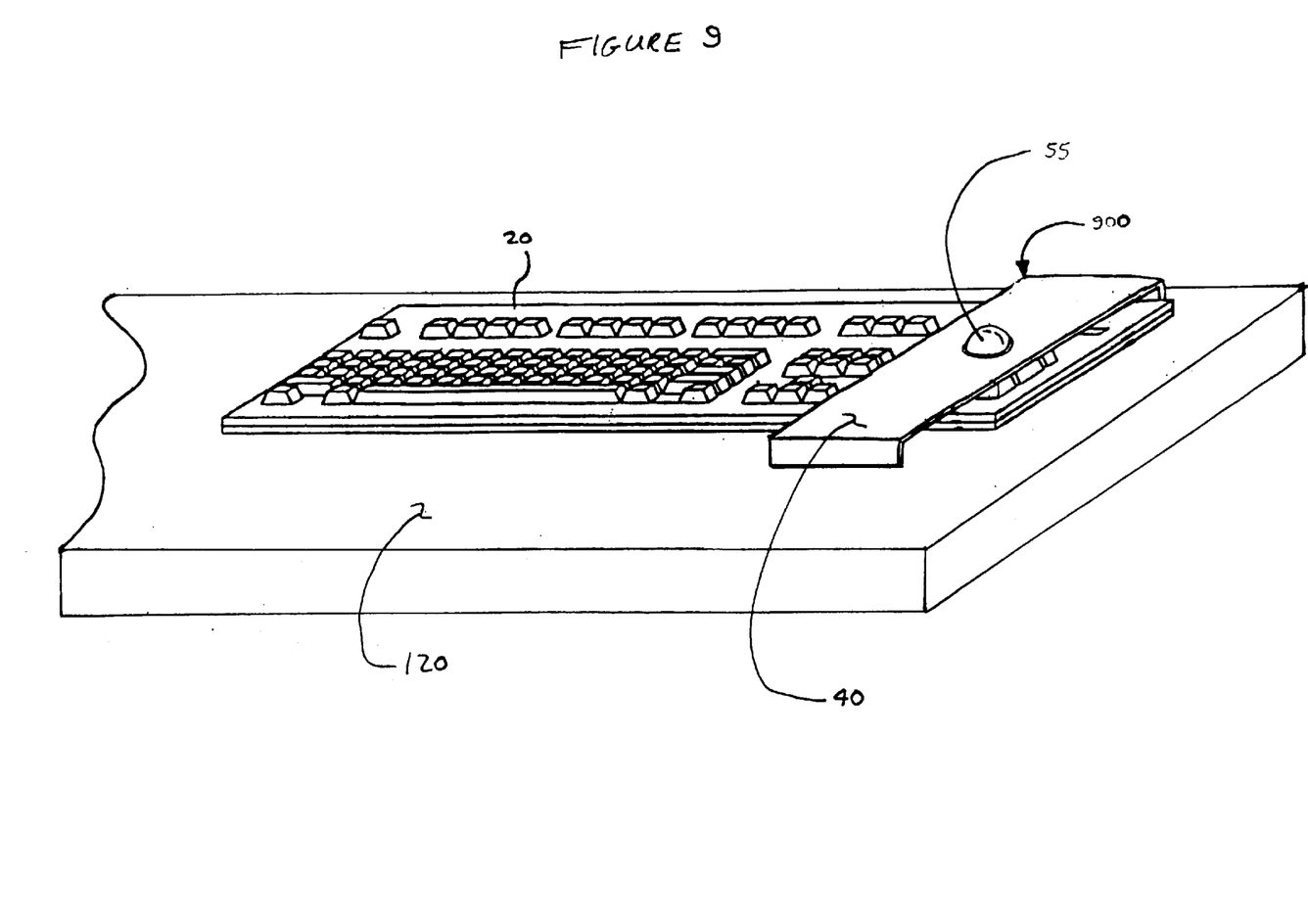
FIG. 9 shows a perspective view of a keyboard with an input device in accordance with still another embodiment of the invention being positioned over the keyboard.

FIG. 9 shows a keyboard 20 in conjunction with an input device 900 comprising an input mechanism 55 attached to input device 900. The input device 900 does not necessarily have an input mechanism corresponding to a key on the keyboard 20. Instead, the input mechanism 55 may correspond to a mouse ball, or a track ball.

Figure 10:
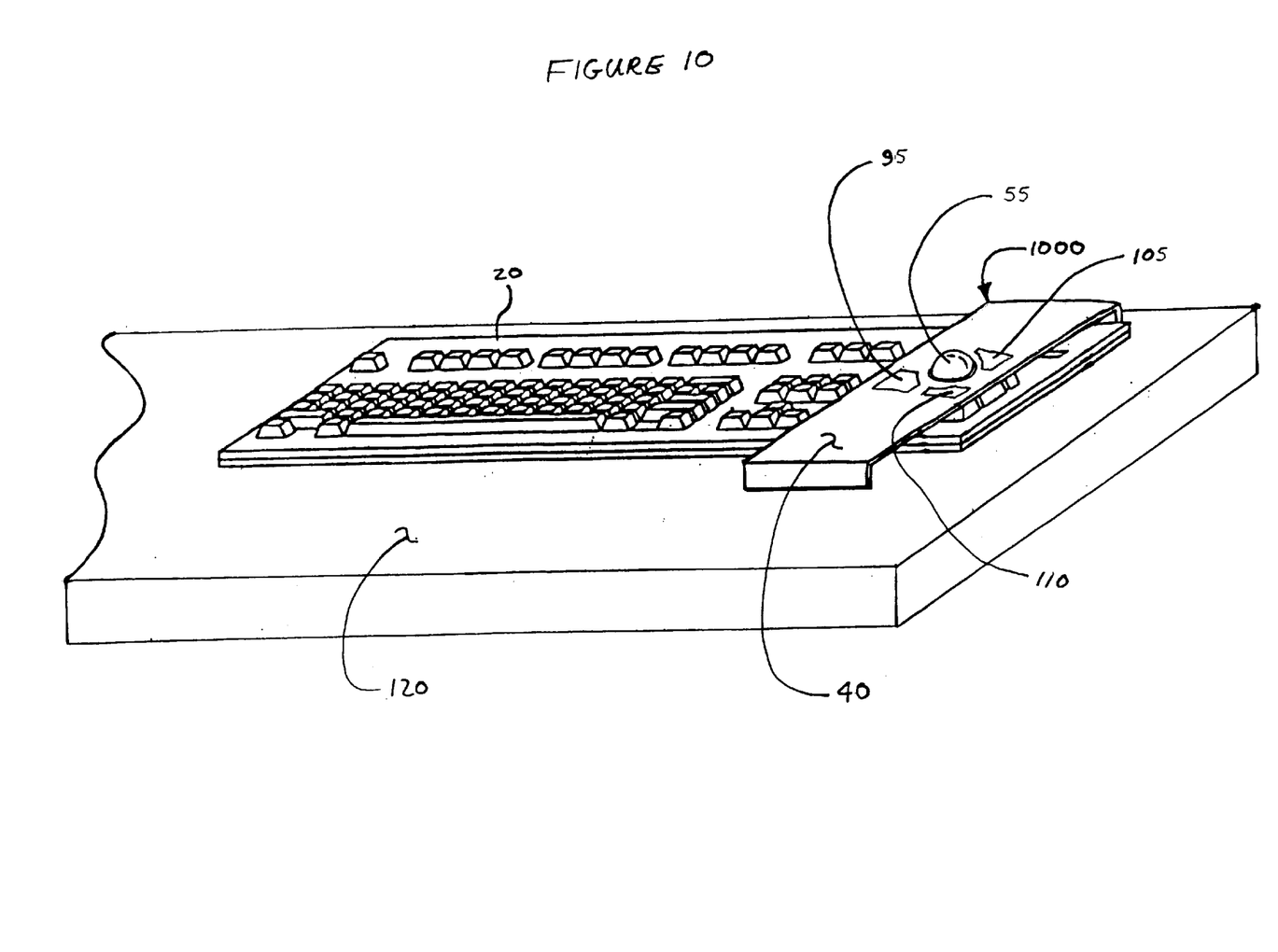
FIG. 10 shows a perspective view of a keyboard with an input device in accordance with even another embodiment of the invention being positioned over the keyboard.

FIG. 10 also shows a keyboard 20 in conjunction with an input device 1000 comprising an input mechanism 55 attached to input device 1000. Also shown in FIG. 10 are input mechanisms 95, 105 that, when activated by a user, may generate electrical signals corresponding to conventional left and right mouse buttons, respectively. Alternatively, third and/or fourth mechanisms 95, 105 may generate electrical signals corresponding to other mouse or joystick inputs. The input devices 900 and 1000 may eliminate the need for a separate mouse. The input devices 900 and 1000 may include one or more of a trackball 55, dials or wheels, buttons, digital tablet, touch screen, or any suitable mechanism for inputting information otherwise input by a mouse or other electrical input device.

Figure 11:
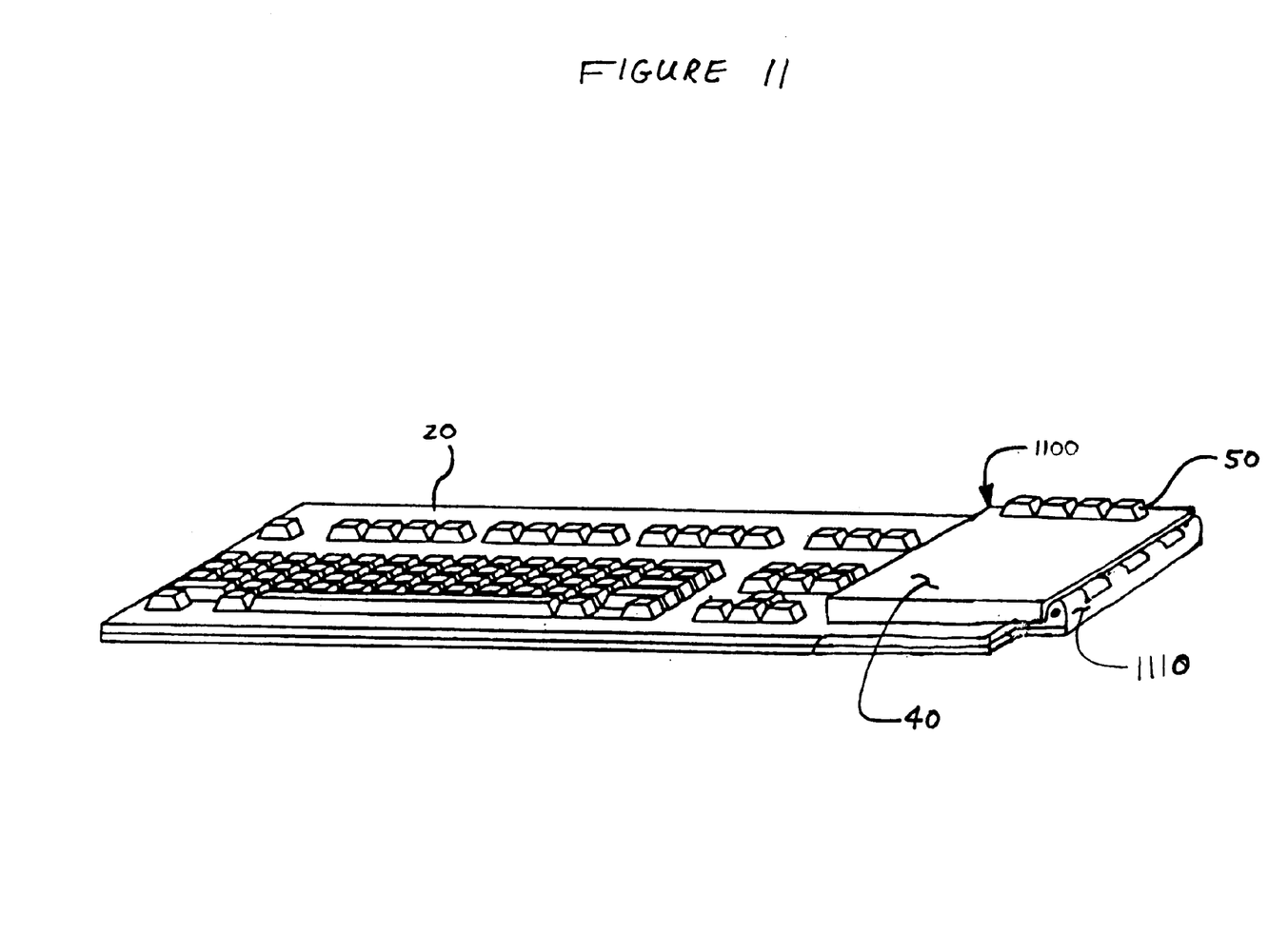
FIG. 11 shows a perspective view of a keyboard with an input device hingably attached with the keyboard in accordance with one embodiment of the invention.

FIG. 11 shows a keyboard 20 in conjunction with an input device 1100 comprising an input mechanism 50 attached to input device 1100. The keyboard 20 may comprise a key 30 (not shown) that, when activated, generates an electrical signal corresponding to the key 30. The input system 1100 is positioned over the keyboard 20 such that the input system 1100 blocks a user's access to the key 30. The first mechanism 50 is accessible to the user and, when activated by the user, generates the first electrical signal corresponding to the key 30 (not shown). The input device 1100 may provide a platform 40 on which to place a conventional computer mouse (not shown).

The input device 1100 may be integral with, or separate or separable from, the keyboard 20. In FIG. 1 the input device 1100 is shown hingably coupled with the keyboard 20 by a hinge 1110. The hinge 1110 may be formed as part of the keyboard 20, as part of the input device 1100, as part of neither, or as part of both. The hinge 1110 may be formed from the same material as the keyboard 20, or from any material with suitable mechanical properties, such as metallic or polymer materials. The hinge 1110, if not formed as part of the input device 1100 and/or keyboard 20, may be fastened to either with fasteners, snap-together members, or Velcro or the like.

Figure 12:
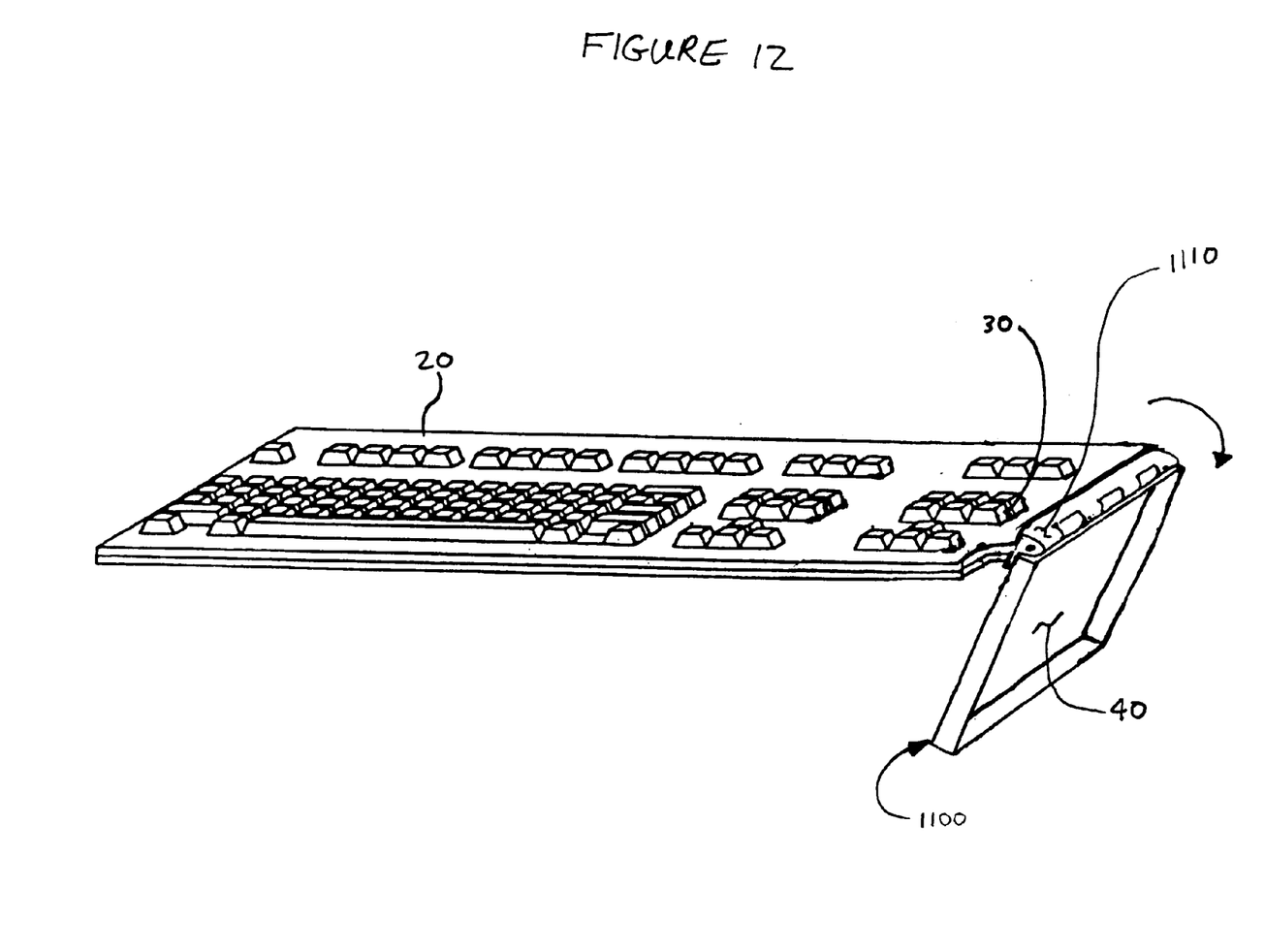
FIG. 12 shows another perspective view of a keyboard with an input device hingably attached with the keyboard in accordance with one embodiment of the invention.

FIG. 12 shows the input device 1100 rotated about hinge 1110 relative to the keyboard 20, exposing key 30. The user may rotate input device 1100 away from the keyboard 20 to gain access to keys otherwise hidden by input device 1100. Input device 1100 may include an integral trackball or other input mechanism/mouse (not shown), eliminating the need for a separate mouse.

While alternative forms of the invention have been shown herein and described by way of illustration, other modifications and variations therein will probably occur to persons skilled in the art. For instance, any one or more of the features depicted in the figures, or described in the accompanying text, may be interchanged with that of another figure to form still other embodiments that would fall within the concluding claims. The concluding claims are thus intended to cover all such changes and modifications as fall within the true spirit and scope of the present invention.

What is claimed is:

1. An input system for use in combination with a keyboard having a key attached to the keyboard, the key generating a first electrical signal corresponding to the key when the key is activated by a user, the input system comprising:
   a body adapted to be positioned over the keyboard such that the body blocks the user's access to the key; and
   a first mechanism attached to the body, the first mechanism adapted to be accessible to the user when the body is positioned over the keyboard, the first mechanism adapted to generate the first electrical signal corresponding to the key without activating the key when the first mechanism is activated by the user.

2. The input system of claim 1, wherein the first mechanism comprises a key.

3. The input system of claim 1, wherein the first mechanism comprises a button.

4. The input system of claim 1, wherein the first mechanism comprises a touchpad.

5. The input system of claim 1, further comprising a platform for supporting a mouse above the keyboard, the platform positioned directly above the keyboard and the platform providing a surface on which to manipulate the mouse and placing the mouse in close proximity to the keyboard.

6. The input system of claim 5, further comprising a hand rest.

7. The input system of claim 1, further comprising a second mechanism that, when activated by the user, generates a second electrical signal, the second electrical signal corresponding to an electrical signal produced by a mouse when the mouse is moved relative to a surface adjacent the mouse.

8. The input system of claim 7, wherein the second mechanism comprises a trackball.

9. The input system of claim 7, wherein the second mechanism comprises a key.

10. The input system of claim 7, wherein the second mechanism comprises a button.

11. The input system of claim 7, wherein the second mechanism comprises a touchpad.

12. The input system of claim 1, further comprising a second mechanism that, when activated by the user, generates a second electrical signal, the second electrical signal corresponding to an electrical signal produced by a mouse button when the mouse button is activated by the user.

13. The input system of claim 12, wherein the second mechanism comprises a key.

14. The input system of claim 12, wherein the second mechanism comprises a button.

15. The input system of claim 12, wherein the second mechanism comprises a touch pad.

16. The input system of claim 1, further comprising a second mechanism that, when activated by the user, generates a second electrical signal, the second electrical signal corresponding to an electrical signal produced by a first rotatable member connected to a mouse when the first rotatable member is rotated by the user.

17. The input system of claim 16, wherein the second mechanism comprises a key.

18. The input system of claim 16, wherein the second mechanism comprises a button.

19. The input system of claim 16, wherein the second mechanism comprises a touchpad.

20. The input system of claim 16, wherein the second mechanism comprises a second rotatable member.

21. The input system of claim 20, wherein the second rotatable member comprises a wheel.

22. The input system of claim 20, wherein the second rotatable member comprises a dial.

23. The input system of claim 20, wherein the second rotatable member comprises a trackball.

24. An input system in combination with a keyboard comprising:
   a support surface;
   a keyboard comprising a first body defining a top surface and a first bottom surface contacting the support surface, a key attached to the keyboard, the key adapted to generate an electrical input signal when a user activates the key by depressing the key;
   an input system adjacent the keyboard, the input system comprising a second body defining a second bottom surface contacting the support surface, the second body extending upward from the support surface to a height, and further extending from the height over at least a portion of the top surface such that the second body extends over and in close proximity to the key, the input system further comprising an input mechanism, the input mechanism generating the electrical input signal without activating the key when the user activates the input mechanism.

25. An input system in combination with a keyboard comprising:
   a keyboard comprising a first body defining a top surface, a key attached to the keyboard, the key adapted to generate an electrical input signal when a user depresses the key;
   an input system comprising a second body attached with the keyboard, the second body extending upward from the keyboard to a height, and further extending from the height over at least a portion of the top surface such that the second body extends over and in close proximity to the key, the input system further comprising an input mechanism, the input mechanism generating the electrical input signal without activating the key when the user activates the input mechanism.

26. An input system for use in combination with a keyboard, comprising a key attached to a keyboard, the key generating an electrical signal corresponding to the key when a user activates the key, the input system positioned over the keyboard such that the input system blocks a user's access to the key, the input system comprising means for generating the electrical signal corresponding to the key without activating the key.

27. An input system in combination with a keyboard, comprising:
   a keyboard having a first body defining a top surface;
   a key protruding from the top surface of the keyboard, the key generating a first electrical signal corresponding to the key when a user activates the key by depressing the key;
   a second body positioned directly above the top surface of the keyboard and directly above the key;
   a first mechanism attached to the second body, the first mechanism generating the first electrical signal corresponding to the key without activating the key when the user activates the first mechanism.

28. The input system of claim 27, further comprising a second mechanism attached to the second body, the second mechanism generating a second electrical signal when the user activates the second mechanism.

* * * * *